United States Patent Office 3,654,112
Patented Apr. 4, 1972

3,654,112
DEVICE FOR MEASURING AND DOSING A GAS
Nicolaas Marinus Beekmans, Leopold Heijne, and Adrianus Teunis Vink, Emmasingel, Eindhoven, Netherlands, assignors to U.S. Philips Corporation, New York, N.Y.
Filed July 17, 1968, Ser. No. 745,586
Claims priority, application Netherlands, July 20, 1967, 6710038
Int. Cl. G01n 27/46
U.S. Cl. 204—195
4 Claims

ABSTRACT OF THE DISCLOSURE

A device for measuring and controlling the composition of a gas in which there is employed a solid partition wall exhibiting a reversible reaction with the gas molecules and ion conductivity. The partition wall is provided on both sides with an electrode layer at least one of these layers being electrically interrupted.

---

Figure 1:
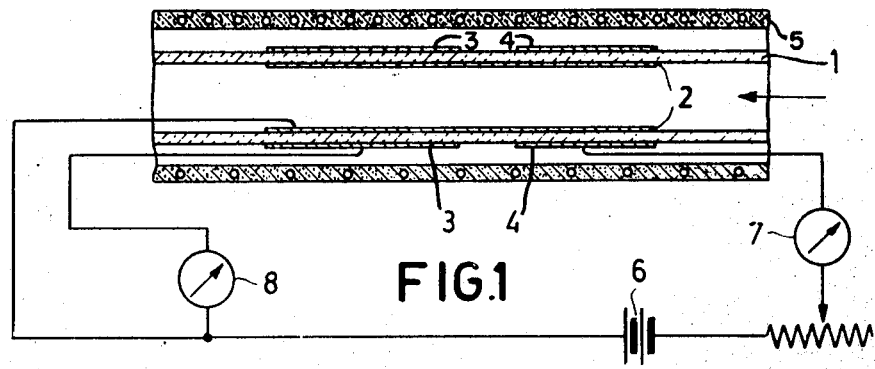

The invention relates to a device for measuring and dosing a gas.

Such a device is known. It comprises a partition wall consisting of a solid which shows a reversible reaction with molecules of the gas in question and ion conductivity, said partition being provided on both sides with a thin metallic and/or semiconductive electrode layer. Such a solid is, for example, thorium oxide or stabilized zirconium oxide which show conductivity by means of oxygen ions while the electrodes consist of a noble metal, for example, platinum. The gas mixture the partial pressure of one of the components of which is to be measured is arranged on one side of the partition wall. On the other side there is a reference as with a known partial pressure. In the case in which oxygen pressures are measured, air is preferably chosen as the reference gas. In another embodiment the partition wall consists of silver halide with which partial pressure of the relative halogens can be measured. The constant reference pressure can be obtained by using a silver electrode on the reference side. Such a silver halide partition wall, notably silver iodide, can be made suitable for measuring sulphur pressures by providing a layer of silver sulphide on the said partition wall. When the temperature is sufficiently high, a voltage difference E is formed as a result of the movement of the ions between the two electrodes, which difference depends upon the ratio of the partial pressures $p_1$ and $p_2$ according to the law of Nernst $E = $ const. log $p_1/p_2$. From this the unknown pressure can directly be derived. By reversal, such a device may also be used for supplying gas to or withdrawing it from a gas mixture in a dosed manner. Instead of measuring a voltage between the electrodes a current is applied in this case. Whether the gas in question is supplied or taken up depends upon the direction of the applied current. Faraday's law may be applied to the relation between the number of Coulombs involved in the quantity of gas ($N:N=$ const. $i.t.$ where $i$ is the current and $t$ is the duration.

In practice there exists a need of a possibility of controlling the content of, for example, oxygen of a gas mixture, in which simultaneously oxygen can be dosed and measured. This could be done by using two separate tubular $ZrO_2$ walls, one of which is connected to a voltmeter and the other of which is connected to a current source. Each of the two devices must be arranged in a furnace.

The combination of the two functions in one tube is too inaccurate in operation, because in the case of current passage a voltage drop $E = i.r.$ is included in the reading of the voltmeter in addition to the desired voltage across the electrodes, where $r$ is the resistance of a zirconium oxide tube and the supply wires. The resistance can be made low, and hence the voltage drop small, by choosing the temperature of the furnace to be high. However, this again gives rise to another source of inaccuracy because as the temperature is chosen to be higher, a larger neutral diffusion of the oxygen through the $ZrO_2$ takes place which is disturbing.

The above-mentioned drawbacks are avoided according to the invention.

The device according to the invention is characterized in that at least one of the two electrode layers is electrically interrupted, one part of it being used as the measuring electrode and the other part being used as the dosing electrode.

In order to obtain a satisfactory mixing of the gas mixture which comes out of the dosing part into the measuring part, it is recommended to narrow the flow aperature between the two parts by providing a specially shaped member which produces whirls.

A preferred embodiment of the device according to the invention which is used, for example, for the automatic keeping constant of the partial pressure of a gascons component in a gas mixture, consists of a derivative in which the voltage difference measured at the measuring electrode is applied with the other electrode on the other side of the partition in a Wheatstone bridge opposite an adjustable reference voltage, the differential voltage being used for controlling the dosing current. The rapid response of the device according to the invention enables the effective operation of the control system.

Figure 2:
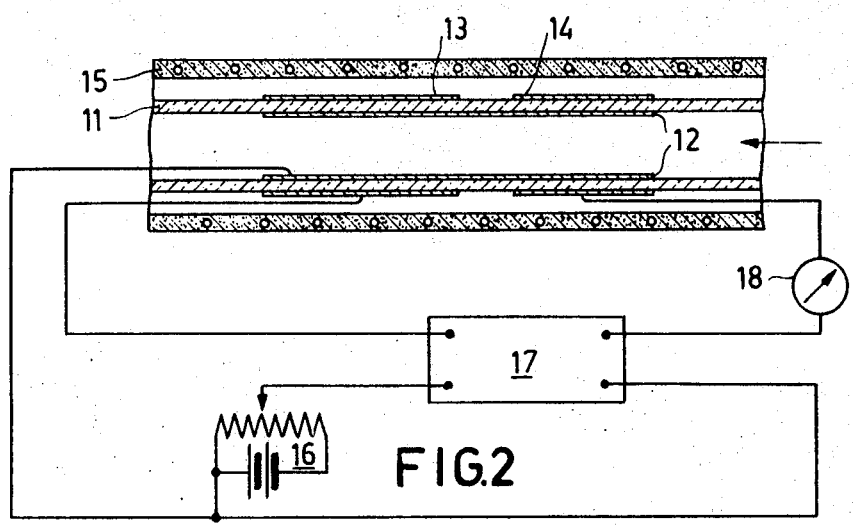

In order that the invention may be readily carried into effect, it will now be described in greater detail, by way of example, with reference to the accompanying drawings, in which:

FIG. 1 shows a device according to the invention for measuring and dosing the partial oxygen pressure in a flowing gas mixture, and FIG. 2 shows an automatic control system.

FIG. 1 shows a longitudinal cross-sectional view of a tube 1 which consists of stabilized zirconium oxide, for example, zirconium oxide which contains 7.5% by weight of CaO. The gas, for example, nitrogen, to be measured and to be doped with oxygen is conducted through said tube from the right. On the inside of the tube is arranged an electrode 2 consisting of a porous platinum layer which is provided, for example, by cathodic disintegration. Two electrodes, 3 and 4, consisting of two mutually insulated platinum layers of the same thickness and obtained in the same manner are arranged on the outside. The assembly is arranged in a furnace 5. A current source 6 and an emitter 7 are connected between the electrodes 2 and 4 and a voltmeter 8 is connected between the electrodes 2 and 3.

In one embodiment the thickness of the platinum layer was 0.1 micron and the temperature of the furnace 700° C.

In FIG. 2, 11 denotes a tube of the same type as 1 in FIG. 1, reference numeral 12 denotes an analogous inner electrode, 13 and 14 denote analogous outer electrodes and 15 is a similar furnace. The electrodes 12 and 13 are connected to the Wheatstone bridge 16 against a reference EMF, the output of which is connected to an amplifier 17 not shown in detail. The output current of the amplifier is applied to the dosing electrode 14 and the electrode 12 with the interposition of an ammeter 18.

As applications of the device according to the invention are mentioned the preparations of gas mixtures with controlled oxygen partial pressure, for example, for sintering processes in the electronic ceramic industry, the adjustment and maintenance of a given gas pressure in a closed system, for example, a vacuum system, or of removing the last traces of oxygen from nitrogen.

A further improvement of the device according to the invention is related to the fact that the measured EMF as a function of the relation of the partial gas pressure, is dependent upon the temperature. This thus means that the device must be used at a constant temperature. By making use of the fact that the ion conductors to be used have resistances which, at the operating temperature, are strongly dependent upon the temperature according to a further preferred embodiment of the device according to the invention, another two electrodes are provided on the surface of the partition which are connected, by means of current conductors to a measuring bridge, the output voltage of which controls the rate of flow of the current to the furnace through an amplifier circuit. Such a circuit is known per se.

Figure 3:
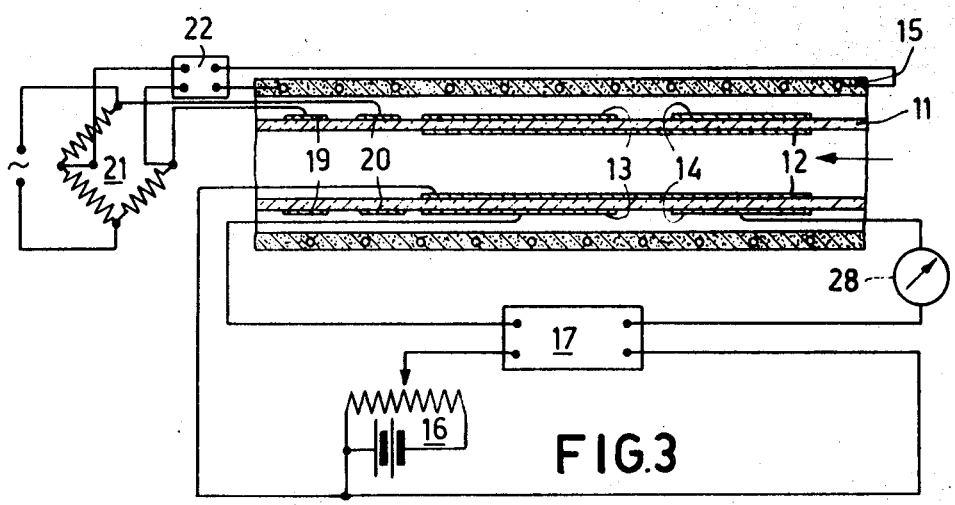

FIG. 3 shows such a device which is similar to that shown in FIG. 2 and in which like components are referred to with like reference numerals. This device comprises in addition two electrodes 19 and 20, a bridge circuit 21 and the amplifier with supply 22 for the electric furnace 15. The supply of the measuring bridge must preferably be an alternating voltage so as to prevent that gas evolution or gas absorption takes place at the electrodes 19 and 20 and to prevent the direct voltage control circuit from experiencing disturbances.

An application of the device for measuring and doping a gas which is possible within the scope of this invention is that as a detector behind a gas chromatograph for the quantitative determination of the components in a mixture of organic substances which react with a gaseous agent. Such a gas mixture is introduced into an inert gas flowing through said device before the gas chromatograph. The various components are separated by the gas chromatographic column and these enter the detector according to the invention one after the other in which a small adjusted quantity of the said agent is evolved. Each time one of the organic components reaches the detector, the quantity of the agent present therein reacts with the components so that a shortage is formed which actuates the dosing mechanism. So much of the agent is generated that the organic substance fully reacts and the adjusted pressure of the gaseous agent is maintained. The quantity of supplied agent, however, is indicated by a variation in the current which can be recorded by means of a recording ammeter. From this an unknown quantity of each of the components can be calculated by means of the reaction comparison. In an embodiment for determining the components in a mixture of combustible organic substances, oxygen is dosed and said oxygen burns the organic substances quantitatively. For each gram equivalent of organic substance 96,500 coulombs are supplied. An advantage of this application with respect to known gas chromatographic detectors is that no assay is necessary. The sensitivity of said detector in one embodiment with $ZrO_2$ without the need of special measures of stabilisation of temperature, rate of gas flow, and so on, was $10^{-9}$ l. $CH_4$ or $3 \times 10^{13}$ molecules.

Figure 4:
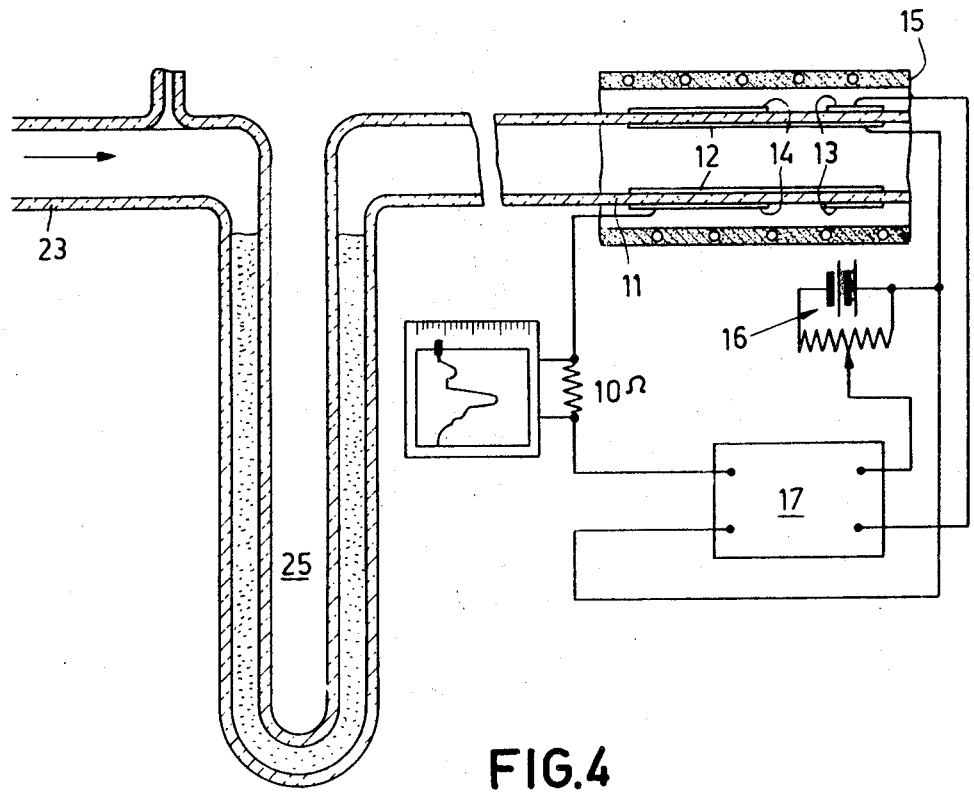

The gas chromatographic arrangement will now be described in detail with reference to a diagrammatic drawing (FIG. 4). A constant flow of inert gas, for example, helium, is introduced at 23, while the gas sample, for example $10^{-6}$ l. is introduced at 24. The gas chromatographic column of which no detailed description is given is shown diagrammatically by 25. After emerging from the column the stream of gas is further transported to a detector as diagrammatically shown in FIG. 2, the reference numerals 11 to 17 of which denote identical components. A recording ammeter 26 records the current flowing through the dosing contact 10. The voltage between the measuring contacts 12 and 13 is adjusted, for example, at 350 mv. or 0.01 p.p.m. of $O_2$. The control amplifier 17 then supplies a small current of, for example, 10 $\mu$a. to adjust said content.

Figure 5:
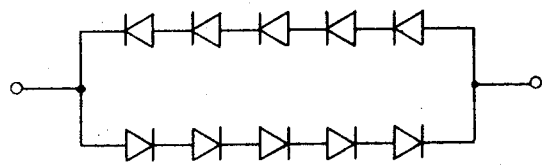

An improvement of the above device may be obtained so as to achieve a good adaptation to the rather large range of the required current intensities (for example, from 1 $\mu$a. to 100 ma.). The associated range of input signals between the measuring contacts 12 and 13, however, may only have a limited extent of, for example, 300 mv. to 600 mv. When a linear amplifier is used, the adaptation may advantageously be effected by an element having non-linear voltage/current characteristics, for example, a diode or a voltage-dependent resistor, to be connected between the dosing contact (14 in FIG. 4) and the output of the amplifier 17. In a practical embodiment a series arrangement of 10 silicon diodes is advantageously used. In an arrangement in which both gas can be evolved and withdrawn, currents may occur in both directions. For each direction of current such a series arrangement is used. This is shown in FIG. 5. Instead of using the forward characteristic of silicon diodes, the cut-off characteristic of zener diodes could alternatively be used.

What is claimed is:

1. A device for simultaneously measuring and controlling the concentration of a gaseous constituent in a gaseous mixture, said device comprising a substantially tubular conduit means for said gaseous mixture, the wall of said tubular conduit means being pervious to said gaseous constituent and comprising at least one metallic oxide, and being capable of conducting electricity predominately by the transfer or migration of ions of the gaseous constituent, electrode layers positioned on both sides of said pervious wall portion, at least one of said electrode layers being electrically interrupted, one part thereof serving as a measuring electrode cooperatively connected to a means for measuring the concentration of said gaseous constituent and the other part thereof serving as a control electrode cooperatively connected to a means for controlling the concentration of said gaseous constituent in said gaseous mixture.

2. A device of claim 1 wherein an additional two electrodes are positioned on a surface of the wall portion pervious to said gaseous constituent and are electrically connected to a measuring bridge the output voltage of which is used to control the power supply of, and thereby keep constant the temperature of a surface serving as a temperature control means for said device.

3. A device of claim 1, particularly adapted for automatically maintaining constant the partial gas pressure in a gas mixture wherein there is included a Wheatstone bridge with an adjustable reference voltage for determining a differential voltage between said reference voltage and the voltage difference measured at the measuring electrode and the control electrode and means for employing said differential voltage to control a current to the control electrode.

4. A device of claim 3 wherein the output of the adjustable reference voltage in the Wheatstone bridge is connected to an amplifier and said amplifier is joined to the control electrode by means of diodes or voltage dependent resistors.

References Cited

UNITED STATES PATENTS

| | | | |
|---|---|---|---|
| 3,216,911 | 11/1965 | Kronenberg | 204—1.1 |
| 3,400,054 | 9/1968 | Ruka et al. | 204—1.1 |
| 3,481,855 | 12/1969 | Kolodney et al. | 204—195 |
| 3,514,377 | 5/1970 | Spacil et al. | 204—1 T |

FOREIGN PATENTS

| | | |
|---|---|---|
| 37,801 | 5/1965 | Germany. |

OTHER REFERENCES

Weissbart et al.: "J. Electrochemical Soc.," vol. 109, 1962, pp. 723–726.

TA-HSUNG TUNG, Primary Examiner

U.S. Cl. X.R.

204—1 T